United States Patent
Chae et al.

(10) Patent No.: US 9,717,089 B2
(45) Date of Patent: Jul. 25, 2017

(54) METHOD AND APPARATUS FOR TRANSMITTING ACKNOWLEDGEMENT OF RECEPTION IN WIRELESS COMMUNICATION SYSTEM

(71) Applicant: LG ELECTRONICS INC., Seoul (KR)

(72) Inventors: Hyukjin Chae, Anyang-si (KR); Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/442,380

(22) PCT Filed: Nov. 26, 2013

(86) PCT No.: PCT/KR2013/010778
§ 371 (c)(1),
(2) Date: May 12, 2015

(87) PCT Pub. No.: WO2014/084566
PCT Pub. Date: Jun. 5, 2014

(65) Prior Publication Data
US 2016/0286558 A1 Sep. 29, 2016

Related U.S. Application Data

(60) Provisional application No. 61/731,452, filed on Nov. 29, 2012.

(51) Int. Cl.
*H04W 72/04* (2009.01)
*H04L 5/00* (2006.01)
*H04L 5/14* (2006.01)

(52) U.S. Cl.
CPC ....... *H04W 72/0473* (2013.01); *H04L 5/0055* (2013.01); *H04W 72/042* (2013.01);
(Continued)

(58) Field of Classification Search
CPC ............. H04W 72/04; H04W 72/0406; H04W 72/042; H04W 72/0413; H04W 52/00; H04W 52/04; H04W 52/146
(Continued)

(56) References Cited

U.S. PATENT DOCUMENTS

2012/0236812 A1 9/2012 Chen et al.
2012/0275395 A1 11/2012 Gerstenberger et al.
(Continued)

FOREIGN PATENT DOCUMENTS

CN 102742206 10/2012
WO 2011132721 10/2011
WO 2012068141 5/2012

OTHER PUBLICATIONS

PCT International Application No. PCT/KR2013/010778, Written Opinion of the International Searching Authority dated Feb. 20, 2014, 18 pages.
(Continued)

*Primary Examiner* — Candal Elpenord
*Assistant Examiner* — Syed M Bokhari
(74) *Attorney, Agent, or Firm* — Lee, Hong, Degerman, Kang & Waimey

(57) ABSTRACT

One embodiment of the present invention relates to a method with which a terminal transmits an acknowledgement of reception in a wireless communication system, the method comprising the steps of: acquiring downlink control information (DCI) via an enhanced physical downlink control channel (EPDCCH); receiving downlink data via physical downlink shared channel (PDSCH); and transmitting an
(Continued)

acknowledgement of reception on the downlink data via a physical uplink control channel (PUCCH) resource; and when the PDSCH is transmitted on a SCell (secondary cell) and the PDSCH is instructed by the EPDCCH, the PUCCH resource is determined on the basis of the transmit power control (TPC) field included in the DCI.

8 Claims, 10 Drawing Sheets

(52) U.S. Cl.
CPC ......... *H04W 72/0413* (2013.01); *H04L 5/001* (2013.01); *H04L 5/0091* (2013.01); *H04L 5/14* (2013.01)

(58) Field of Classification Search
USPC .................................................. 370/329, 241
See application file for complete search history.

(56) References Cited

U.S. PATENT DOCUMENTS

| | | | |
|---|---|---|---|
| 2012/0294204 A1 | 11/2012 | Chen et al. | |
| 2013/0034073 A1* | 2/2013 | Aiba | H04L 1/0026 370/329 |
| 2013/0194931 A1* | 8/2013 | Lee | H04L 5/0053 370/241 |
| 2014/0036810 A1* | 2/2014 | Harrison | H04W 72/042 370/329 |
| 2014/0126491 A1* | 5/2014 | Ekpenyong | H04L 5/0055 370/329 |
| 2016/0013917 A1* | 1/2016 | Han | H04L 1/1854 370/329 |
| 2016/0037507 A1* | 2/2016 | Baldemair | H04L 1/003 370/329 |

OTHER PUBLICATIONS

Panasonic, "PUCCH resource allocation for carrier aggregation for EPDCCH," 3GPP TSG-RAN WG1 Meeting #71, R1-125078, Nov. 2012, 3 pages.
ZTE, "Issues on UL TPC transmission in LTE-Advanced," 3GPP TSG RAN WG1 Meeting #61, R1-102909, May 2010, 3 pages.
PCT International Application No. PCT/KR2013/010778, Written Opinion of the International Searching Authority dated Feb. 20, 2014, 12 pages.
European Search Report issued in Application No. 13858768.8, Jun. 23, 2016, 8 pages.
Intel Corporation, "Remaining details on PUCCH resource allocation for EPDCCH," 3GPP TSG-RAN WG1 #71 R1-124728, New Orleans, USA, Nov. 12-16, 2012, 6 pages.
Panasonic, "PUCCH resource allocation for carrier aggregation for EPDCCH," 3GPP TSG-RAN WG1 Meeting #71, R1-125078, New Orleans, USA, Nov. 12-16, 2012, 4 pages.
Intel Corporation, "Remaining details on PUCCH resource allocation for EPDCCH," 3GPP TSG-RAN WG1 #71, R1-124728, Nov. 2012, 6 pages.
State Intellectual Property Office of the People's Republic of China Application Serial No. 201380062452.6, Office Action dated Mar. 20, 2017, 21 pages.

\* cited by examiner (a)

(b)

METHOD AND APPARATUS FOR TRANSMITTING ACKNOWLEDGEMENT OF RECEPTION IN WIRELESS COMMUNICATION SYSTEM

CROSS-REFERENCE TO RELATED APPLICATIONS

This application is the National Stage filing under 35 U.S.C. 371 of International Application No. PCT/KR2013/010778, filed on Nov. 26, 2013, which claims the benefit of U.S. Provisional Application No. 61/731,452, filed on Nov. 29, 2012, the contents of which are all hereby incorporated by reference herein in their entirety.

TECHNICAL FIELD

The present invention relates to a wireless communication system, and more particularly, to a method and apparatus for transmitting a reception response, when an Enhanced Physical Downlink Control Channel (EPDCCH) is used.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention devised to solve the conventional problem is to provide a method for, when control information is received on an EPDCCH, transmitting a reception response to the received control information. Particularly, when carrier aggregation is used, the present invention determines resources in which a reception response is to be transmitted and defines related fields.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting a reception response in a wireless communication system, performed by a User Equipment (UE) includes acquiring Downlink Control Information (DCI) from an Enhanced Physical Downlink Control Channel (EPDCCH), receiving downlink data on a Physical Downlink Shared Channel (PDSCH), and transmitting a reception response to the downlink data in Physical Uplink Control Channel (PUCCH) resources. If the PDSCH is transmitted in a Secondary Cell (SCell) and indicated by the EPDCCH, the PUCCH resources are determined based on a Transmit Power Control (TPC) field included in the DCI.

In another aspect of the present invention, a UE for transmitting a reception response to an EPDCCH in a wireless communication system includes a reception module and a processor. The processor is configured to acquire DCI from an EPDCCH, receive downlink data on a PDSCH, and transmit a reception response to the downlink data in PUCCH resources. If the PDSCH is transmitted in a SCell and indicated by the EPDCCH, the PUCCH resources are determined based on a TPC field included in the DCI.

The first and second aspects of the present invention may include the followings.

An offset field related to the PUCCH resources, included in the DCI may be padded with 0s.

The EPDCCH may be transmitted in a Primary Cell (PCell).

The PUCCH resources may be determined to correspond to a value of the TPC field among resource values indicated by higher-layer signaling.

The PUCCH resources may be determined to correspond to a combination of a value of the TPC field and a value of an offset field related to the PUCCH resources among resource values indicated by higher-layer signaling.

Up to 16 resource values may be indicated by the higher-layer signaling.

The PUCCH resources determined based on the TPC field may be shifted by a value of an offset field related to the PUCCH resources.

The value of the offset field related to the PUCCH resources may indicate one of $\{-2, -1, 0, 2\}$.

A value of an offset field related to the PUCCH resources may be used for determining transmission power of the PUCCH resources.

The offset field may be a Hybrid Automatic Repeat reQuest (HARQ)-ACKnowledgment (ACK) resource offset field.

The DCI may be formatted in one of DCI formats 1, 1A, 1B, 1D, 2, 2A, 2B, 2C, and 2D.

The reception response may include at least one of an ACK, a Negative ACK (NACK), and a Discontinuous Transmission (DTX).

Advantageous Effects

According to the present invention, when a Physical Downlink Shared Channel (PDSCH) indicated by an Enhanced Physical Downlink Control Channel (EPDCCH) is transmitted in a Secondary Cell (SCell), resources for transmitting a reception response can be determined. Further, the bit use efficiency of a Downlink Control Information (DCI) format can be increased by making clear the usages of fields that may be used in the procedure for determining the resources for transmitting the reception response.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
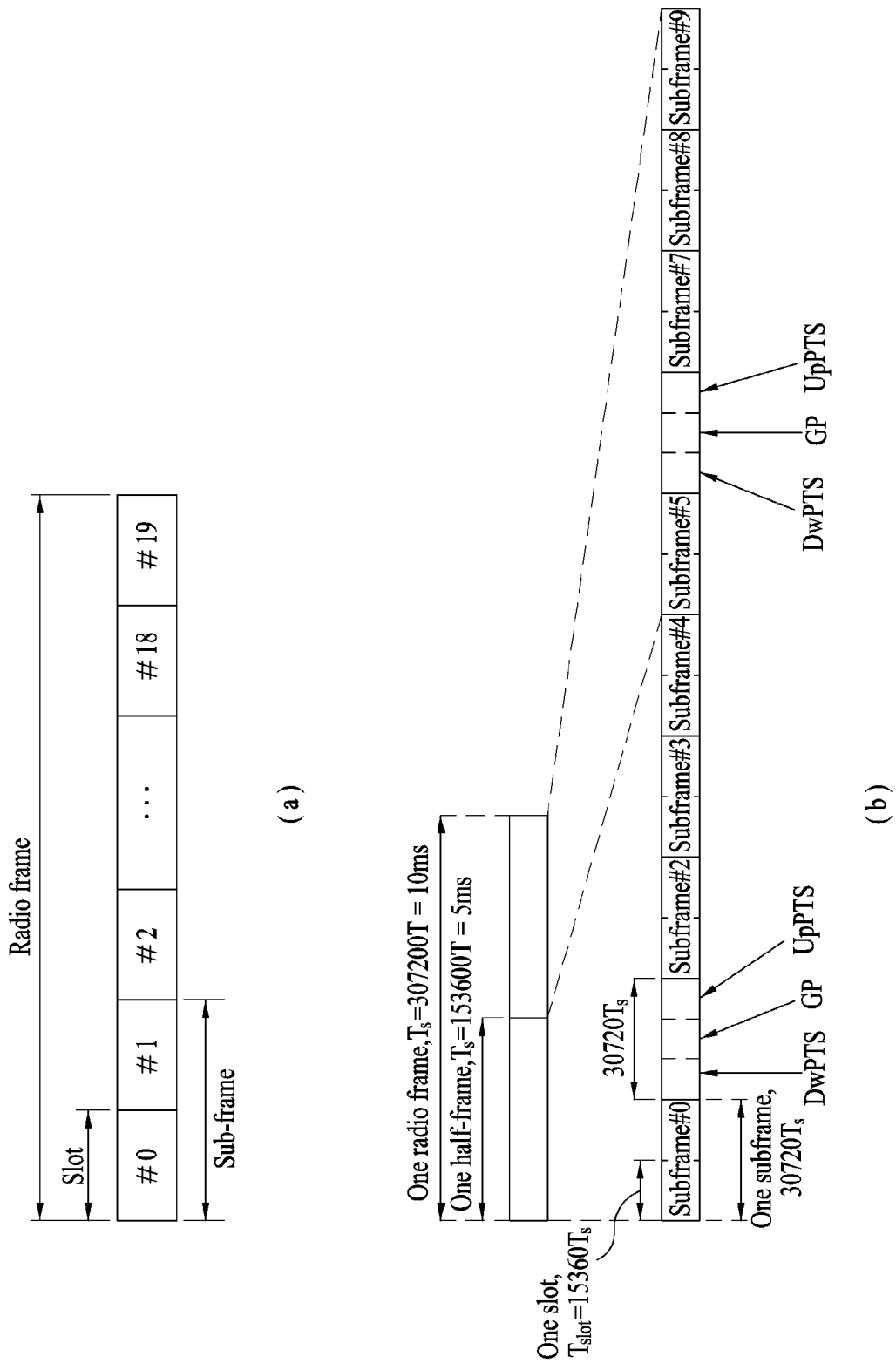
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
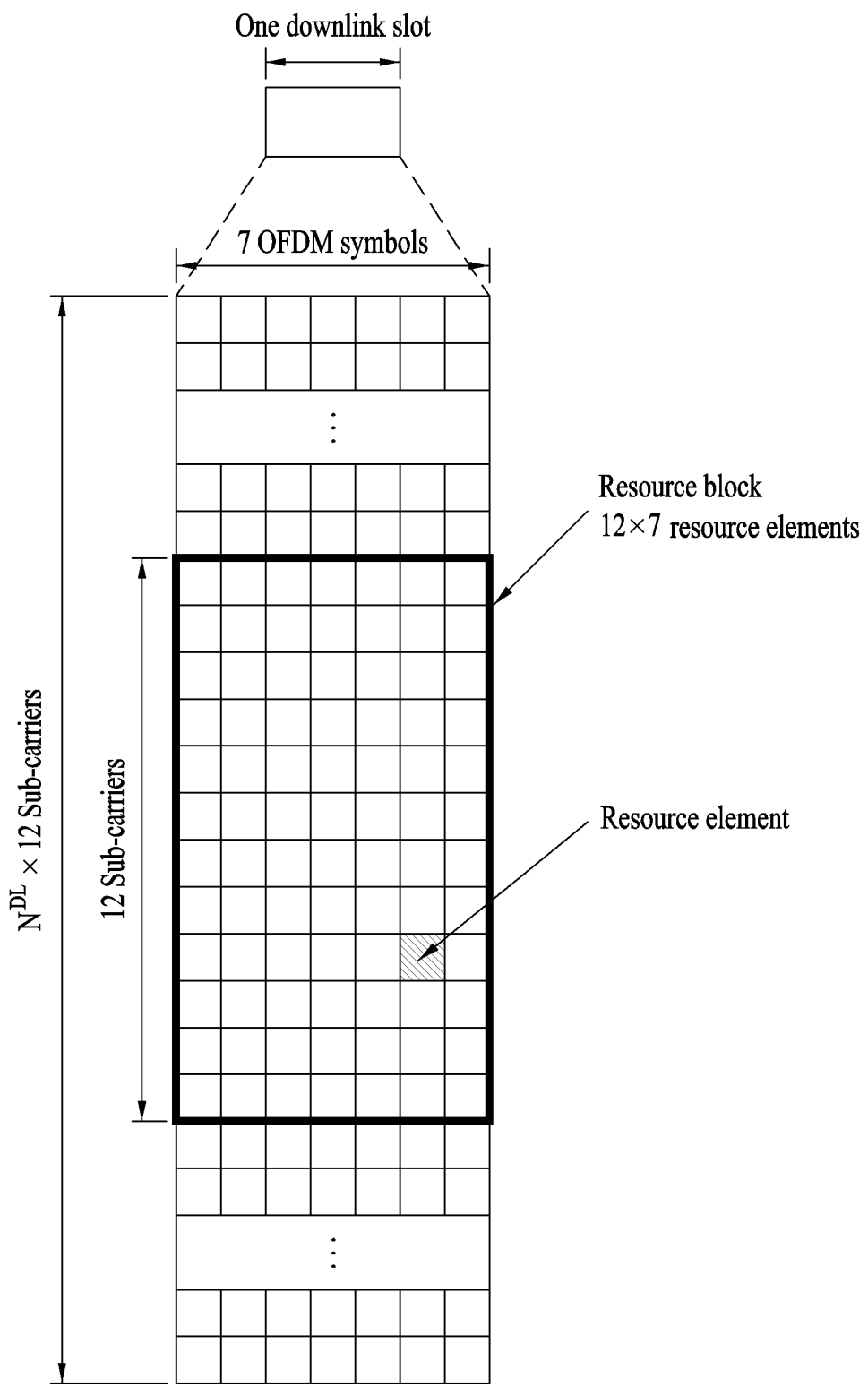
FIG. 2 illustrates a resource grid for the duration of a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
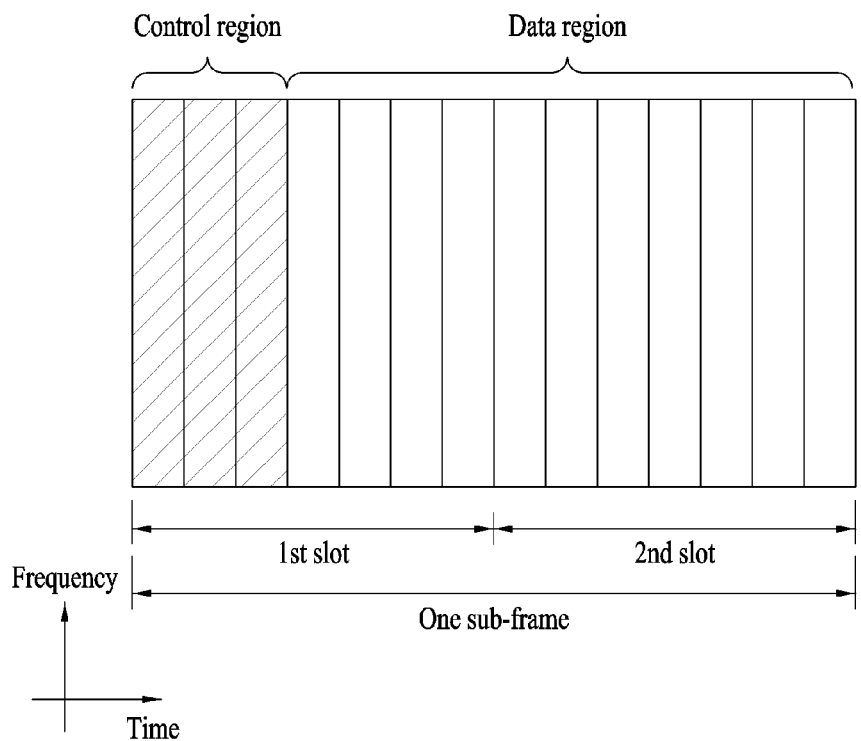
FIG. 3 illustrates a downlink subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
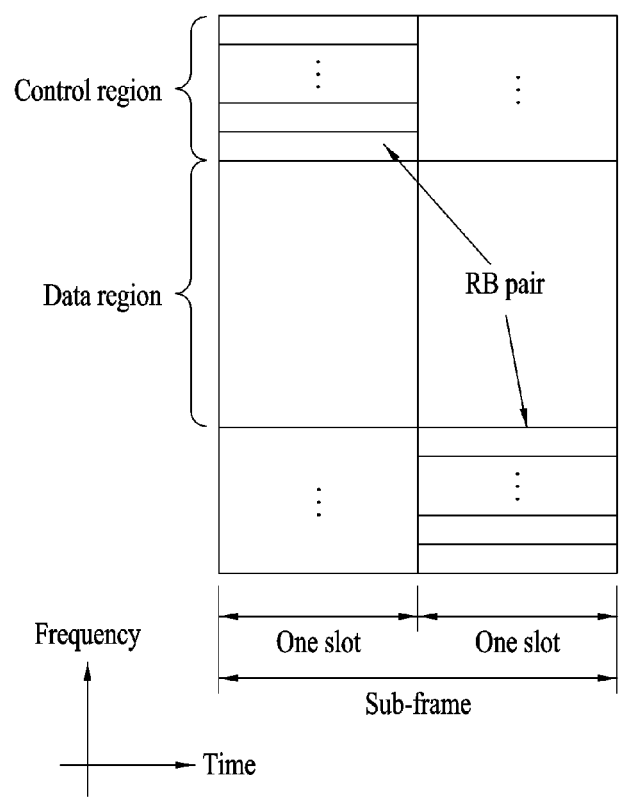
FIG. 4 illustrates an uplink subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL control information (UCI) transmitted over a PUCCH may include a scheduling request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted over the PUCCH. When code division multiplexing (CDM) is performed to distinguish between signals of UEs, constant amplitude zero autocorrelation (CAZAC) with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to DL data transmitted over a PUCCH is covered using an orthogonal sequence or orthogonal cover (OC).

In addition, control information transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information.

In 3GPP LTE, a PUCCH is defined in seven different formats according to transmitted control information, a modulation scheme and the amount of control information. Attributes of transmitted uplink control information (UCI) for each PUCCH format may be summarized as shown in Table 1.

TABLE 1

| PUCCH format | Modulation Scheme | Number of bits per subframe | Usage | Etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI+ ACK/NACK | Normal CP only |
| 2b | QPSK + BPSK | 22 | CQI+ ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
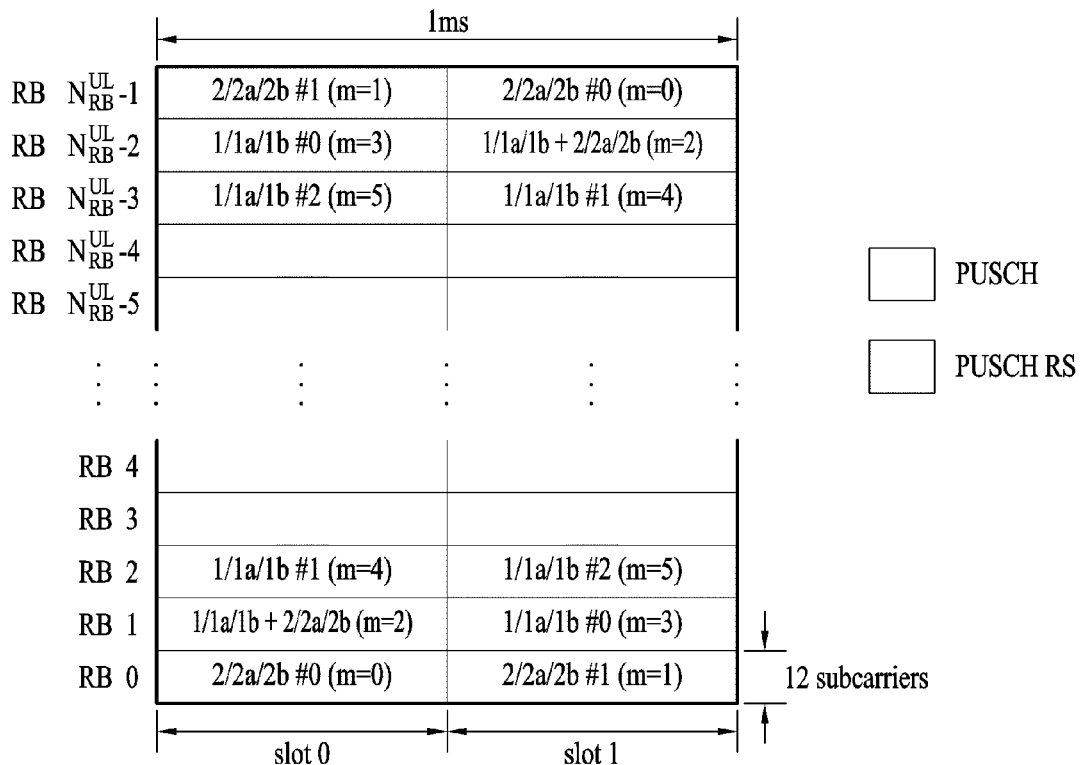
FIG. 5 illustrates mapping of Physical Uplink Control Channel (PUCCH) formats to uplink Physical Resource Blocks (PRBs)

FIG. 5 illustrates mapping of PUCCH formats to PUCCH regions in UL physical resource blocks. In FIG. 5, $n_{PUCCH}^{(2)}$ denotes the number of resource blocks on UL, and 0, 1, . . . , $n_{PUCCH}^{(2)}-1$ represent physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($n_{PUCCH}^{(I)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
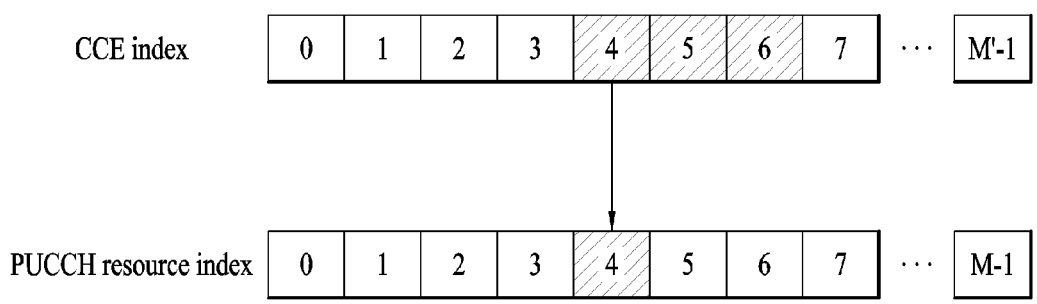
FIG. 6 illustrates an example of determining PUCCH resources for an Acknowledgement/Negative Acknowledgement (ACK/NACK)

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)} \quad \text{Equation 1}$$

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, ..., N−1) having a length of N gives a result of y(0), y(1), y(2), ..., y(N−1). Symbols y(0), y(1), y(2), ..., and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a discrete Fourier transform (DFT) with a length of 3 is employed for shortened ACK/NACK information and a reference signal. For an extended CP, a Hadamard sequence with a length of 2 is employed for a reference signal.

Figure 7:
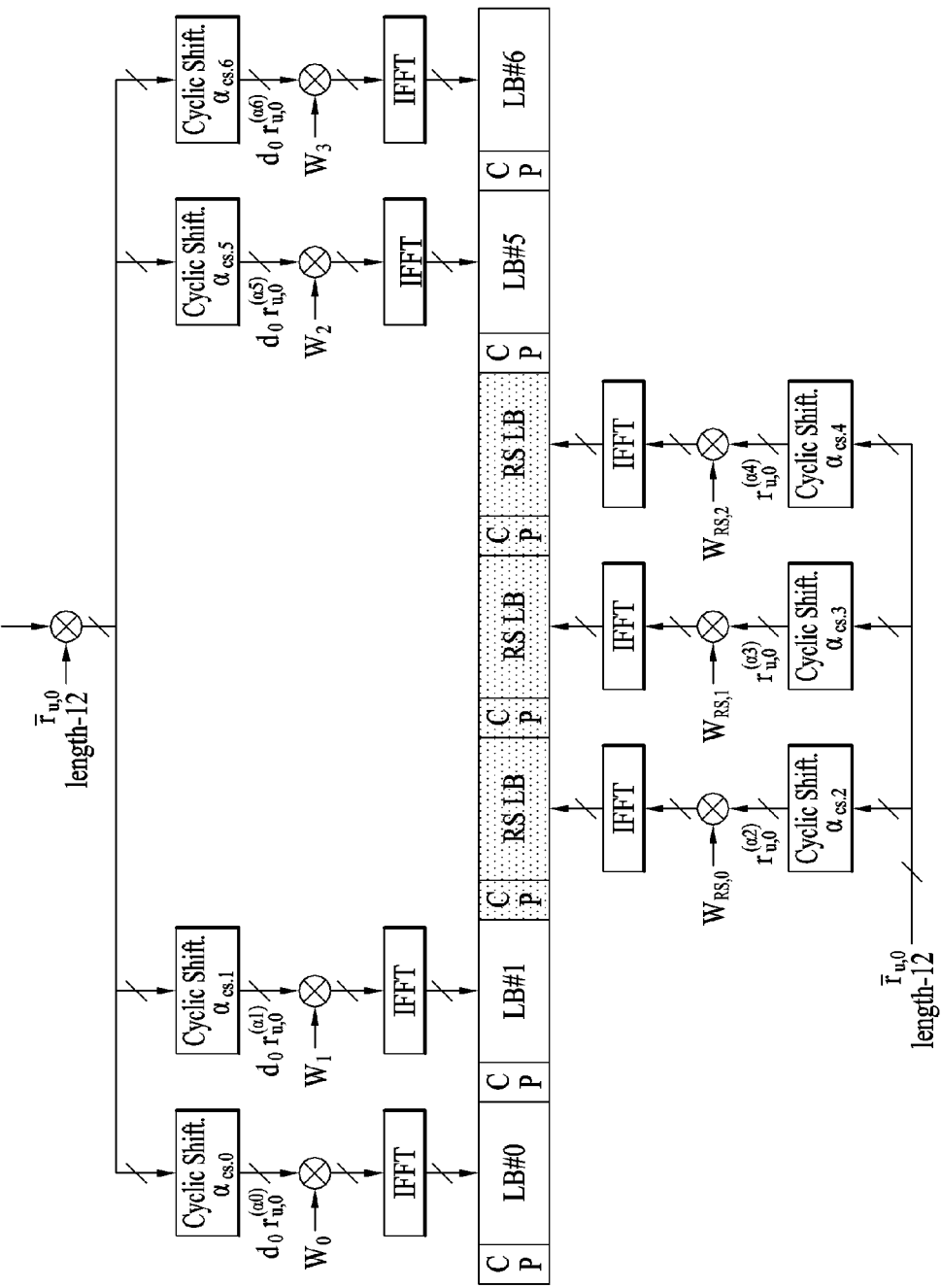
FIG. 7 illustrates a structure of an ACK/NACK channel in the case of normal Cyclic Prefix (CP)

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1-bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different cyclic shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter ($\Delta_{shift}^{PUCCH}$), and $\Delta_{shift}^{PUCCH} \in \{1, 2, 3\}$ represents 12, 6 or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as orthogonal covering (OC).

A plurality of UEs may be multiplexed in a code division multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in Tables 2 and 3. Table 2 shows a sequence for a symbol having a length of 4 and Table 3 shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(\tilde{p})}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 3

| Sequence index $n_{oc}^{(\tilde{p})}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A scheduling request (SR) is transmitted by requesting scheduling of the UE or not requesting scheduling of the UE. An SR channel reuses an ACK/NACK channel structure in PUCCH formats 1a/1b and is configured in an on-off keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
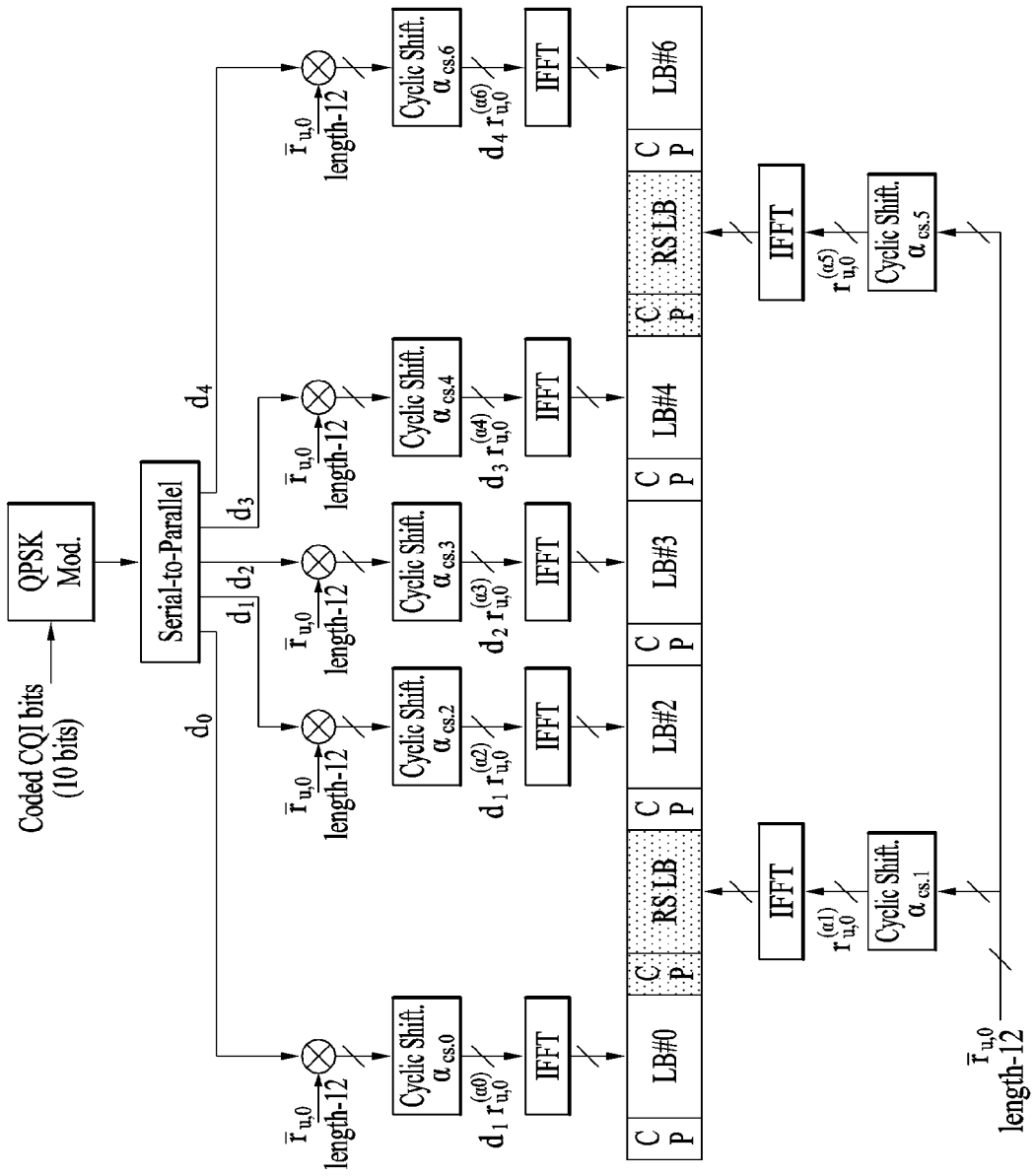
FIG. 8 illustrates a structure of a Channel Quality Indicator (CQI) channel in the case of normal CP.

FIG. 8 illustrates a CQI channel structure for a normal CP. SC-FDMA symbols #1 and #5 (second and sixth symbols) from among SC-FDMA symbols #0 to #6 of a slot may be used to transmit a demodulation reference signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index $n_{PUCCH}^{(2)}$ is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Figure 9:
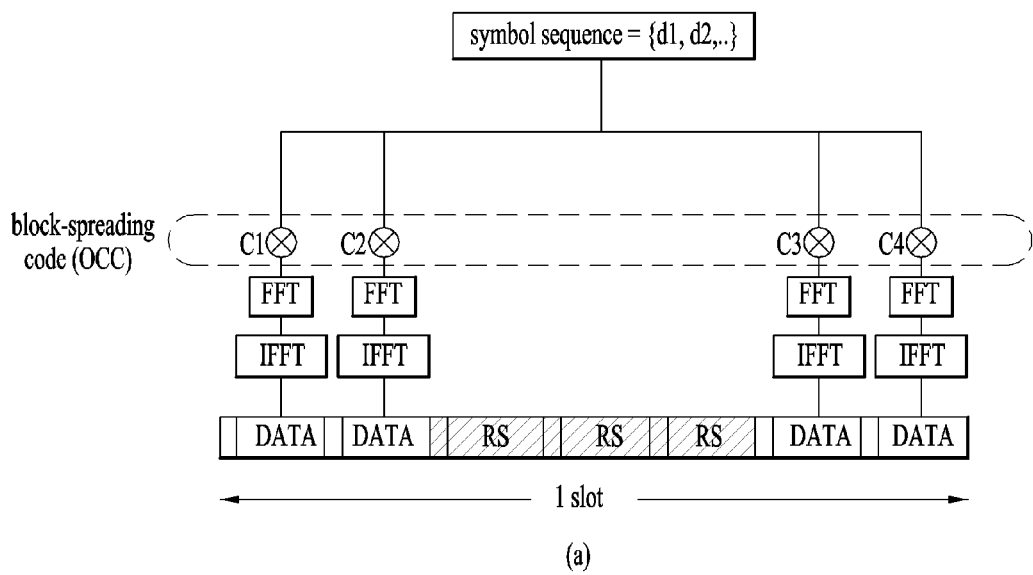
FIG. 9 illustrates a structure of a PUCCH to which block spreading is applied.
Figure 9:
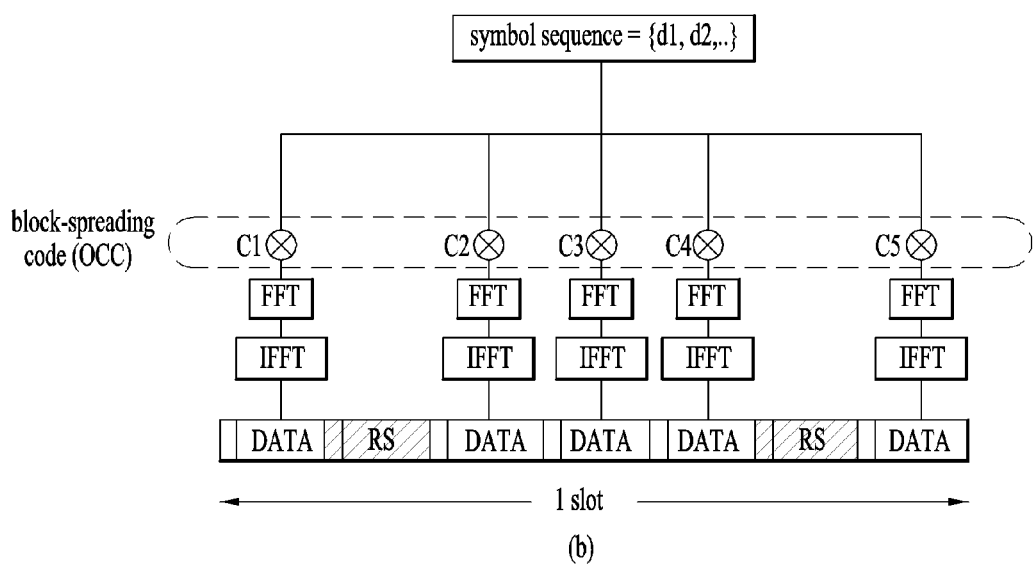

Block spreading is a method of modulating a control signal using SC-FDMA, which is distinguished from the PUCCH format 1 or 2 series. As shown in FIG. 9, a symbol sequence may be spread in the time domain using an orthogonal cover code (OCC) and transmitted. Control signals of a plurality UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or spreading factor (SF)=4) in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12×2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in Table 4.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 4, HARQ-ACK(i) (i=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in Table 4. Referring to Table 4, DTX (Discontinuous Transmission) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in Table 4), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in Table 4), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b(0), b(1) in Table 4) to the content of actual ACK/NACK. ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in Table 4). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good cubic metric (CM) property or a good peak-to-average power ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Figure 10:
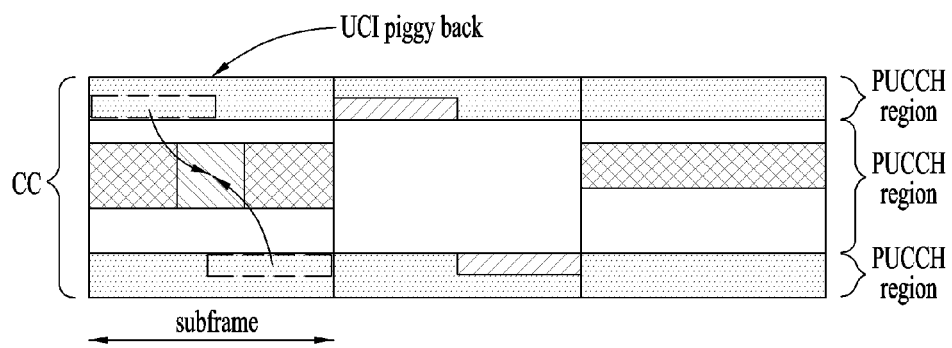
FIG. 10 illustrates a method for transmitting Uplink Control Information (UCI) on a Physical Uplink Shared Channel (PUSCH)

Thus, when PUSCH transmission takes place in the same subframe as that for PUCCH transmission as illustrated in FIG. 10, uplink control information (UCI) to be transmitted on a PUCCH may be piggybacked together with data over a PUSCH in order to maintain the single carrier characteristics.

As described above, the legacy LTE UE cannot simultaneously transmit the PUCCH and the PUSCH, and thus the UE multiplexes UCI (CQI/PMI, HARQ-ACK, RI, etc.) in a PUSCH region in a subframe in which the PUSCH is transmitted. For example, when CQI and/or PMI is transmitted in a subframe assigned for PUSCH transmission, UL-SCH data and CQI/PMI may be multiplexed prior to DFT-spreading, such that control information and data are simultaneously transmitted. In this case, rate matching is performed for the UL-SCH data in consideration of CQI/PMI resources. In addition, control information such as HARQ ACK and RI may be multiplexed in the PUSCH region by puncturing the UL-SCH data.

Carrier Aggregation (CA)

Figure 11:
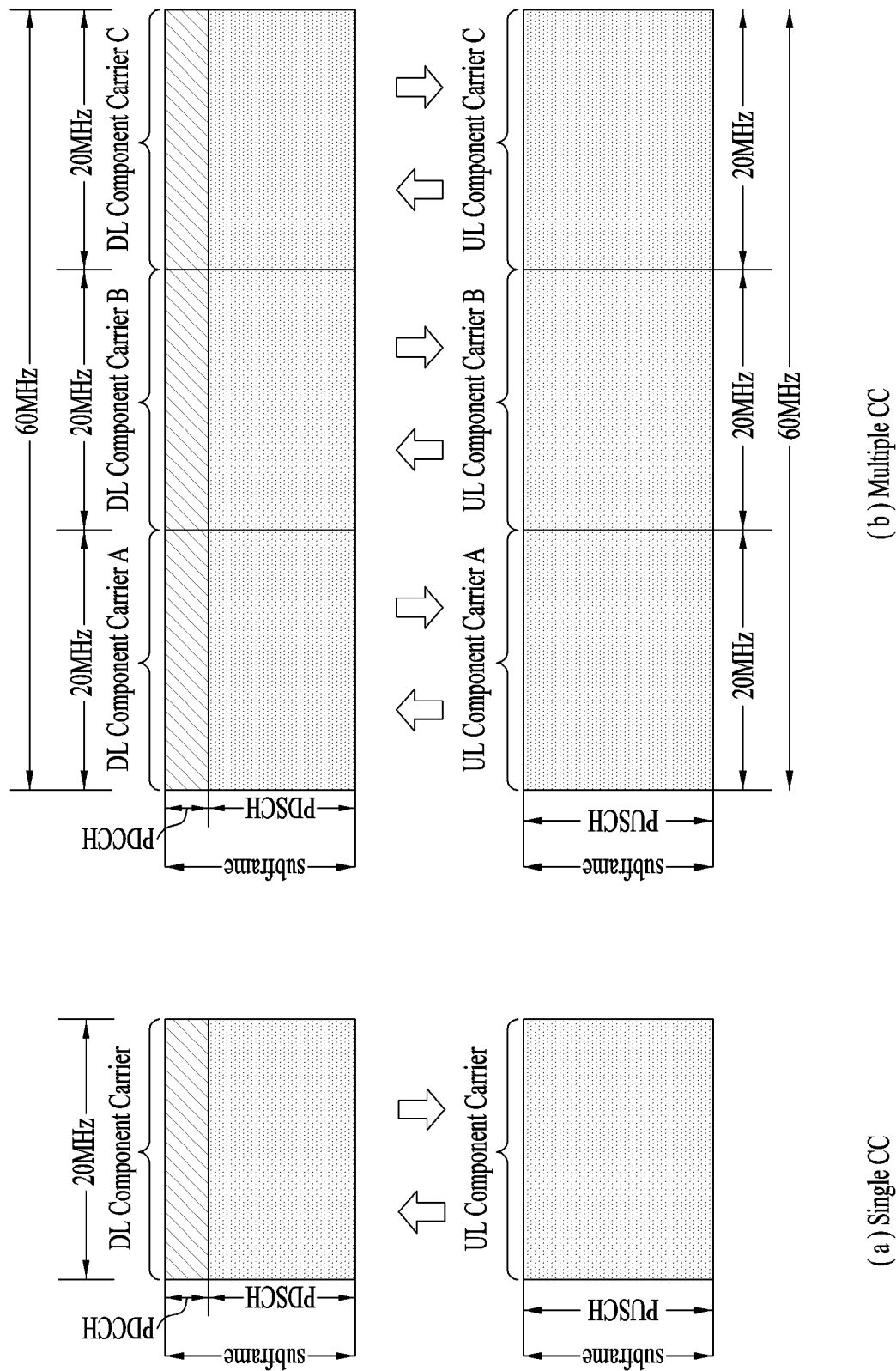
FIG. 11 is a view referred to for describing Carrier Aggregation (CA)

FIG. 11 is a view referred to for describing CA. Before describing CA, the concept of cell that an LTE-A system uses in order to manage radio resources will first be described. A cell may be defined as a combination of DL resources and UL resources, and UL resources are not mandatory for configuring a cell. Accordingly, the cell may be composed of DL resources alone or both DL resources and UL resources. This is the definition of cell in LTE-A Release 10. The opposite case is also viable. That is, a cell may be composed of UL resources alone. DL resources may be referred to as a DL Component Carrier (CC) and UL resources may be referred to as a UL CC. The DL CC and the UL CC may be represented as carrier frequencies and a carrier frequency means a center frequency of a cell.

Cells may be classified into Primary Cell (PCell) operating in a primary frequency and Secondary Cell (SCell) operating in a secondary frequency. The PCell and the SCell may be collectively referred to as serving cells. The PCell may be a cell indicated during an initial connection establishment procedure, connection re-establishment procedure, or handover procedure of a UE. That is, the PCell may be understood as a cell that plays a main role in a control operation in a later-described CA environment. A PUCCH of a PCell configured for a UE may be allocated to the UE and the UE may transmit the PUCCH in the PCell. A SCell may be configured after Radio Resource Control (RRC) connection establishment and used to provide additional radio resources. In a CA environment, the remaining serving cells except for a PCell may be regarded as SCells. When the UE is in RRC_CONNECTED state, if CA is not configured for the UE or the UE does not support CA, one serving cell composed of only a PCell is present for the UE. In contrast, if the UE is in the RRC_CONNECTED state and CA is configured for the UE, one or more serving cells are present for the UE and the total serving cells include a PCell and total SCells. After an initial security activation procedure starts, a network may configure one or more SCells for a UE supporting CA in addition to a PCell that is initially configured during a connection establishment procedure.

With reference to FIG. 11, CA will be described below. CA was introduced to use a wider frequency band, to thereby satisfy demands for higher data rates. CA may be defined as an aggregate of two or more different CCs. FIG. 11(a) illustrates subframes in a legacy LTE system using a single CC, and FIG. 11(b) illustrates subframes when CA is used. A total bandwidth of 60 MHz is shown in FIG. 11(b) as supported by aggregating three 20-MHz CCs, by way of example. Herein, the CCs may be contiguous or non-contiguous.

A UE may simultaneously receive and monitor DL data on a plurality of DL CCs. The linkage between DL CCs and UL CCs may be indicated by system information. The DL CC/UL CC linkage may be fixed or may be configured semi-statically in the system. Even though a total system band includes N CCs, a frequency band that a specific UE may monitor/receive may be limited to M (<N) CCs. Various parameters related to CA may be configured cell-specifically, UE group-specifically, or UE-specifically.

Figure 12:
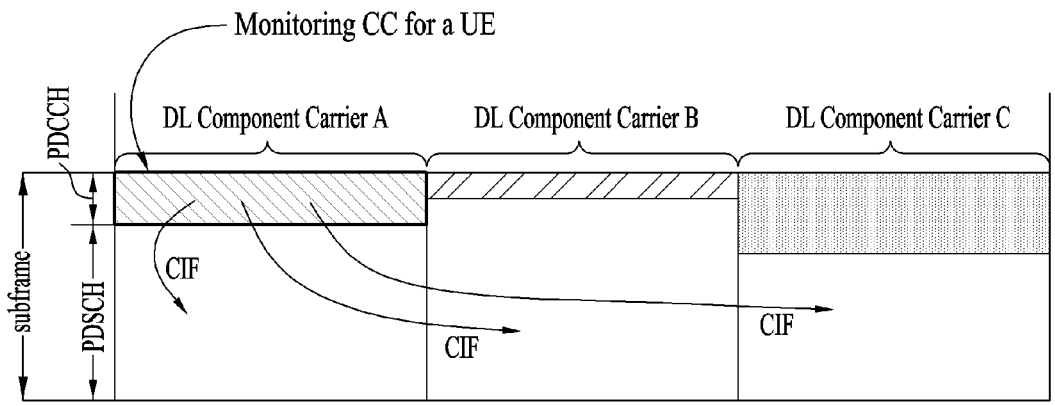
FIG. 12 is a view referred to for describing cross carrier scheduling.

FIG. 12 is a view referred to for describing cross carrier scheduling. Cross carrier scheduling refers to, for example, inclusion of all DL scheduling allocation information about other DL CCs in a control region of a DL CC among a plurality of serving cells, or inclusion of all UL scheduling grant information about a plurality of UL CCs linked to a DL CC among a plurality of serving cells in a control region of the DL CC. First, a Carrier Indicator Field (CIF) will be described.

As described before, the CIF may or may not be included in a DCI format transmitted on a PDCCH. If the CIF is included in the DCI format, this means use of cross carrier scheduling. If cross carrier scheduling is not used, DL scheduling allocation information is valid for a DL CC carrying the current DL scheduling allocation information. Further, a UL scheduling grant is valid for a single UL CC linked to a DL CC carrying DL scheduling allocation information.

If cross carrier scheduling is used, the CIF indicates a CC related to DL scheduling allocation information transmitted on a PDCCH in a DL CC. For example, referring to FIG. 12, DL allocation information about DL CC B and DL CC C, that is, information about PDSCH resources is transmitted on a PDCCH in a control region of DL CC A. A UE may identify a PDSCH resource region and a corresponding CC from a CIF by monitoring DL CC A.

Whether a PDCCH includes a CIF or not may be configured semi-statically and the CIF may be enabled UE-specifically by higher-layer signaling. If the CIF is disabled, a PDCCH of a specific DL CC may allocate PDSCH resources of the same DL CC and PUSCH resources of a UL CC linked to the specific DL CC. In this case, the same coding, CCE-based resource mapping, and DCI format as used in a legacy PDCCH structure are applicable.

On the other hand, if the CIF is enabled, a PDCCH of a specific DL CC may allocate PDSCH/PUSCH resources of a DL/UL CC indicated by the CIF among a plurality of aggregated CCs. In this case, the CIF may be additionally defined in a legacy PDCCH DCI format. The CIF may be defined as a field having a fixed length of 3 bits or the position of the CIF may be fixed irrespective of a DCI format size. Even in this case, the same coding scheme, CCE-based resource mapping, and DCI format as used for the legacy PDCCH structure are applicable.

Even when the CIF is present, an eNB may allocate a PDCCH monitoring DL CC set, thereby mitigating the blind decoding constraint of a UE. The PDCCH monitoring CC set is a part of total aggregated DL CCs and the UE may perform PDCCH detection/decoding only in the PDCCH monitoring CC set. That is, to schedule a PDSCH/PUSCH for the UE, the eNB may transmit a PDCCH only in the PDCCH monitoring CC set. The PDCCH monitoring DL CC set may be configured UE-specifically, UE group-specifically, or cell-specifically. For example, if 3 DL CCs are aggregated, DL CC A may be configured as a PDCCH monitoring DL CC as illustrated in the example of FIG. 12. If the CIF is disabled, a PDCCH of each DL CC may schedule only a PDSCH of DL CC A. On the other hand, if the CIF is enabled, a PDCCH of DL CC A may schedule a PDSCH of another DL CC as well as DL CC A. If DL CC A is configured as a PDCCH monitoring CC, DL CC B and DL CC C do not deliver a PDSCH.

In the above-described CA system, the UE may receive a plurality of PDSCHs on a plurality of DL carriers. Then the UE may have to transmit an ACK/NACK for each data in one subframe of one UL CC. If one subframe carries a plurality of ACKs/NACKs in PUCCH format 1a/1b, high transmission power is required and the Peak to Average Power Ratio (PAPR) of UL transmission is increased. The resulting inefficient use of a transmission power amplifier may lead to a decrease in a transmittable distance from the UE to the eNB. To transmit a plurality of ACKs/NACKs on a single PUCCH, ACK/NACK bundling or ACK/NACK multiplexing may be performed.

Also, it may occur that ACK/NACK information for a large number of DL data along with the use of CA and/or ACK/NACK information for a large number of DL data transmitted in a plurality of DL subframes in a TDD system should be transmitted on a PUCCH in one subframe. If the number of ACK/NACK bits to be transmitted is larger than the number of bits supported by ACK/NACK bundling or ACK/NACK multiplexing, the above methods are not viable for successful transmission of the ACK/NACK information.

UL Power Control

In the LTE/LTE-A system, UL power control is performed for reliable demodulation of UL control information and data. The UL power control may be classified into PUCCH power control, PUSCH power control, and UL Sounding Reference Signal (SRS) power control.

PUCCH power control is determined in consideration of a path loss and a maximum transmission power of a UE in order to enable demodulation of control information transmitted on a PUCCH at a sufficiently low error rate.

Specifically, PUCCH power control may be performed for subframe i of cell c according to the following [Equation 2].

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBM]$$

[Equation 2]

In [Equation 2], $P_{CMAX,c}(i)$ represents the maximum transmission power of the UE, which is an upper limit of a PUCCH power control command.

$P_{O\_PUCCH}$ is a PUCCH transmission power value that an eNB wants to receive. This value is indicated as a UE-specific parameter by higher-layer signaling and determined to be the sum of a nominal power value $P_{O\_NOMINAL\_PUCCH}$ and $P_{O\_UE\_PUCCH}$.

$PL_c$ is a path loss value in cell c, estimated by the UE. The UE may estimate the path loss value by measuring the received power of DL Cell-specific Reference Signals (CRSs).

$h(n_{CQI}, n_{HARQ}, n_{SR})$ is a value dependent on a PUCCH format, where $n_{CQI}$ is the number of bits representing channel quality information, $n_{HARQ}$ is the number of HARQ bits, and if subframe i is configured for a Scheduling Request (SR), $n_{SR}$ is 1 and otherwise, $n_{SR}$ is 0. $h(n_{CQI}, n_{HARQ}, n_{SR})$ is dependent on a PUCCH format. Specifically, i) $h(n_{CQI}, n_{HARQ}, n_{SR})$ may be 0 in PUCCH formats 1, 1a, and 1b, ii) if one or more serving cells are used in PUCCH format 1b, $h(n_{CQI}, n_{HARQ}, n_{SR})$ may be $$\frac{(n_{HARQ} - 1)}{2},$$

and iii) if a normal CP is used in PUCCH formats 2, 2a, and 2b, $h(n_{CQI}, n_{HARQ}, n_{SR})$ may be $$10\log_{10}\left(\frac{n_{CQI}}{4}\right).$$

$\Delta_{F\_PUCCH}(F)$ is a value indicated in consideration of a Modulation and Coding Scheme (MCS) by higher-layer signaling. This is used to reflect the need for different Signal to Noise Interference Ratios (SINRs) since different numbers of bits per subframe and different error rates are required according to PUCCH formats.

$\Delta_{TxD}(F')$ is a power offset indicated by higher-layer signaling, when a PUCCH is transmitted through two antenna ports. $\Delta_{TxD}(F')$ is dependent on a PUCCH format.

g(i) is a current accumulated PUCCH power control state value, which is determined by a power value $\delta_{PUCCH}$ corresponding to the value of a Transmit Power Control (TPC) command field included in a DCI format transmitted on a PDCCH and a PUCCH power control state value g(i−1) of the previous subframe. $\delta_{PUCCH}$ may be determined based on a value of a TPC field included in a DCI format according to [Table 5].

TABLE 5

| TPC field value | $\delta_{PUCCH}$ [dB] |
|---|---|
| 0 | −1 |
| 1 | 0 |
| 2 | 1 |
| 3 | 3 |

If PUCCH transmission is not performed, PUSCH power control may be determined by [Equation 3].

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dB] \quad \text{[Equation 3]}$$

$P_{CMAX,c}(i)$ represents the maximum transmission power of the UE and $M_{PUSCH,c}(i)$ represents a PUSCH transmission bandwidth in Resource Blocks (RBs).

$P_{O\_PUSCH,c}(j)$ is a PUSCH transmission power value that the eNB wants to receive. This value is determined to be the sum of a nominal power value $P_{O\_NOMINAL\_PUCCH}$ and $P_{O\_UE\_PUCCH}$. It is determined that j=0 in semi-persistent scheduling, j=1 in dynamic scheduling, and j=2 for a Random Access Response (RAR).

$\alpha_c(j) \cdot PL_c$ is a DL path loss value, where $PL_c$ is a value estimated by the UE and $\alpha_c(j)$ is a path loss compensation value indicated by higher-layer signaling. If j is 0 or 1, $\alpha_c \in \{0, 0.4, 0.5, 0.6, 0.7, 0.8, 0.9, 1\}$. If j is 1, $\alpha_c(j)=1$.

$\Delta_{TF,c}(i)$ is a value calculated using a value indicated by higher-layer signaling and the number of bits such as the number of Bits Per RE (BPRE), the number of bits in a CQI, or the number of bits in a PMI.

$f_c(i)$ is an accumulated value determined by a power value $\delta_{PUCCH}$ corresponding to the value of a TPC field included in a DCI format transmitted on a PDCCH, $K_{PUSCH}$ being a value determined by a Frequency Division Duplex (FDD) or Time Division Duplex (TDD) setting, and an accumulated value of the previous subframe, $f_c(i-1)$.

If PUCCH transmission is accompanied by PUSCH transmission, PUSCH power control is performed according to [Equation 4].

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dB] \quad \text{[Equation 4]}$$

$\hat{P}_{CMAX,c}(i)$ is a value linear to $P_{CMAX,c}(i)$ and $\hat{P}_{PUCCH}(i)$ is a value linear to PUCCH power control determined by [Equation 2]. The other parameters have been described before.

Enhanced-PDCCH (EPDCCH)

The EPDCCH that may be transmitted in a legacy PDSCH region is under consideration as a solution to the lack of PDCCH capacity and inter-cell interference caused by Coordinated Multi-Point (CoMP), Multi-User Multiple Input Multiple Output (MU-MIMO), etc. in an LTE system beyond Release 11. Compared to a legacy CRS-based PDCCH, the EPDCCH allows for Demodulation Reference Signal (DMRS)-based channel estimation to achieve a pre-coding gain.

Depending on the configuration of a Physical Resource Block (PRB) pair used for EPDCCH transmission, localized EPDCCH transmission and distributed EPDCCH transmission may be defined. The localized EPDCCH transmission means that ECCEs used for one DCI transmission are contiguous in the frequency domain, and specific precoding may be used to achieve a beamforming gain. For example, the localized EPDCCH transmission may be based on as many contiguous ECCEs as determined by an aggregation level. On the contrary, the distributed EPDCCH transmission means that one EPDCCH is transmitted in PRB pairs distributed in the frequency domain. The distributed EPDCCH transmission offers a frequency diversity gain. For example, the distributed EPDCCH transmission may be based on an ECCE having 4 EREGs included in each distributed PRB pair. One or two EPDCCH PRB sets may be configured for a UE by higher-layer signaling and each EPDCCH PRB set may be used for one of the localized EPDCCH transmission and the distributed EPDCCH transmission.

To receive/acquire DCI from an EPDCCH, the UE may perform blind decoding in a similar manner to in the legacy LTE/LTE-A system. More specifically, the UE may attempt to decode (monitor) an EPDCCH candidate set for each aggregation level, with respect to DCI formats corresponding to a configured transmission mode. The EPDCCH candidate set to be monitored may be referred to as an EPDCCH UE-specific search space and this search space may be configured/set for each aggregation level. Compared to the afore-described legacy LTE/LTE-A system, aggregation levels {1, 2, 4, 8, 16, 32} are available according to a subframe type, a CP length, and the amount of available resources in a PRB pair.

If an EPDCCH is configured for a UE, the UE indexes REs included in a PRB pair set as EREGs and indexes these EREGs on an ECCE basis. The UE determines EPDCCH candidates that form a search space based on the indexed ECCEs and performs blind decoding on the determined EPDCCH candidates, thereby receiving control information. Herein, EREG and ECCE correspond to REG and CCE of the legacy LTE/LTE-A system, respectively. One PRB pair may include 16 EREGs.

Upon receipt of an EPDCCH, the UE may transmit an ACK/NACK for the EPDCCH on a PUCCH. The indexes of resources for ACK/NACK transmission, that is, the indexes of PUCCH resources may be determined by the lowest of the indexes of ECCEs used for the EPDCCH transmission, similarly to [Equation 1], that is, according to the following [Equation 5].

$$n_{PUCCH-ECCE}^{(1)} = n_{ECCE} + N_{PUCCH}^{(1)}$$ [Equation 5]

In [Equation 5], $n_{PUCCH-ECCE}^{(1)}$ represents a PUCCH resource index, $n_{ECCE}$ represents the lowest of the indexes of ECCEs used for EPDCCH transmission, and $N_{PUCCH}^{(1)}$ (or $N_{PUCCH,EPDCCH}^{(1)}$) represents the starting point of PUCCH resource indexes, indicated by higher-layer signaling.

However, if a PUCCH resource index is determined unconditionally by [Equation 5], resource collision may occur. For example, if two EPDCCH PRB sets are configured, ECCE indexing is independent in each EPDCCH PRB set. Therefore, the EPDCCH PRB sets may have the same lowest ECCE index. Although this problem may be solved by setting different PUCCH resource starting points for different users, different PUCCH resource starting points for all users amounts to reservation of a large number of PUCCH resources, which is inefficient. Further, DCI from a plurality of users may be transmitted at the same ECCE position on an EPDCCH, as is the case with MU-MIMO. Therefore, there is a need for a method for allocating PUCCH resources, taking the consideration into account. To avoid collision between PUCCH resources, a Hybrid Automatic Repeat reQuest (HARQ)-ACK Resource Offset (ARO) field was introduced. When DCI format 1, 1A, 1B, 1D, 2, 2A, 2B, 2C, or 2D is transmitted on an EPDCCH, the ARO field exists as a 2-bit information field in the DCI format.

A PDSCH may be transmitted in a PCell or a SCell. The PDSCH may be indicated by a PDCCH or an EPDCCH. There is no specified method for determining PUCCH resources in the case where a PDSCH is transmitted in a SCell and indicated by an EPDCCH, among possible cases. For this case, the present invention defines a method for determining PUCCH resources and usages of an ARO field and a TPC field that are necessarily included since an EPDCCH indicates a PDSCH.

Embodiment 1—FDD

Figure 13:
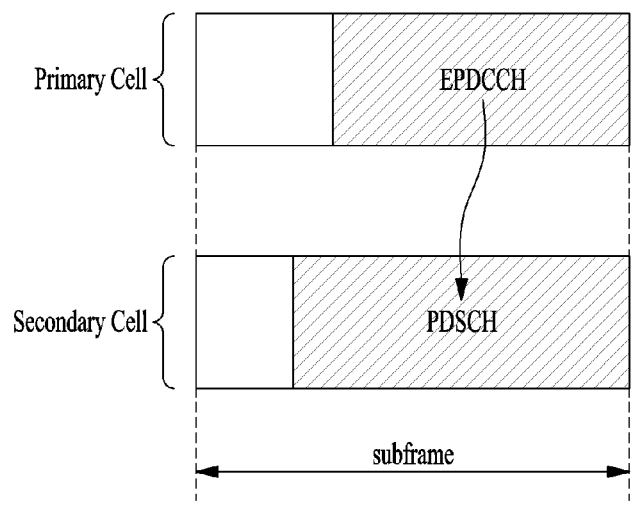
FIG. 13 illustrates an embodiment of the present invention.

If a UE for which DCI reception on an EPDCCH has been configured receives a PDSCH of a SCell indicated by the EPDCCH, PUCCH resources may be determined based on a TPC field included in the DCI received on the EPDCCH. That is, PUCCH resources may be determined to correspond to a value of a 2-bit TPC field among resource values indicated by higher-layer signaling. For example, as illustrated in FIG. 13, if the UE receives DCI on an EPDCCH of a PCell and receives DL data on a PDSCH of a SCell indicated by the EPDCCH, the UE may determine PUCCH resources based on the following [Table 6].

TABLE 6

| Value of 'TPC command for PUCCH' | PUCCH resource value |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

In the above case, the DCI received on the EPDCCH includes an ARO field. Since PUCCH resources are determined based on a TPC field instead of an ECCE index and the ARO field, the ARO field may be padded with 0s.

Instead of padding the ARO field with 0s, additional meanings/operations may be defined using the 2 bits of the ARO field (the operations may be predefined or for a more dynamic use of the ARO field, a specific operation may be indicated to the UE by RRC signaling). Related examples will be described below.

PUCCH resources may be indicated by a value of a TPC field and a value of an ARO field in combination. In this case, the number of values that may represent PUCCH resources may be increased to up to 16. [Table 7] below may be a specific example of a method for indicating PUCCH resources by a value of a TPC field and a value of an ARO field in combination.

TABLE 7

| Value of 'TPC command for PUCCH' | PUCCH resource value |
|---|---|
| '0000' | The 1st PUCCH resource value configured by the higher layers |
| '0001' | The 2nd PUCCH resource value configured by the higher layers |
| ... | ... |
| '1110' | The 15th PUCCH resource value configured by the higher layers |
| '1111' | The 16th PUCCH resource value configured by the higher layers |

In another embodiment, PUCCH resources determined based on a TPC field of DCI received on an EPDCCH may be shifted by an ARO value. In other words, the ARO value is used for fine tuning of a PUCCH resource value determined based on the TPC field in an EPDCCH scheduling a PDSCH of a SCell. Herein, the ARO may indicate the same ARO value as used in FDD (i.e., one of {−2, −1, 0, 2}). In TDD, different ARO values may be configured. In this case, PUCCH resources can be allocated dynamically although they are indicated by a TPC field. Therefore, the use efficiency of the PUCCH resources can be increased.

In another embodiment, an ARO is used to indicate a PUCCH resource value (among values indicated by higher-layer signaling) of a SCell in an EPDCCH scheduling a PDSCH of the SCell and a TPC field may be used for fine tuning of the PUCCH resource value indicated by the ARO (i.e. the TPC field is borrowed as an ARO). In other words, the TPC field may be used to indicate PUCCH resources for a PDSCH of a SCell and the ARO may be used to offset PUCCH resources indicated by the TPC field. Specifically, for example, 2-bit values of the TPC field {00, 01, 10, 11} indicate offset values {−2, −1, 0, 2}, respectively and these offset values indicate more detailed PUCCH resource positions by correcting PUCCH resource positions detected from the ARO.

In another embodiment, the ARO may be used in determining transmission power of PUCCH resources. In other words, the ARO may serve a TPC usage (accumulated power control of a PUCCH) in an EPDCCH scheduling a PDSCH of a SCell. In this case, the TPC field of a PCell is used for power control of the PCell and the TPC field of a SCell is used for power control of the SCell. This method is advantageous in that accumulated power control of a SCell is enabled in a repeater or CoMP scenario 4 in which the SCell is transmitted from a physically different location.

The ARO may be used as a value for fine tuning of TPC of a PCell. In this case, both a PCell and a SCell may have been indicated for EPDCCH monitoring.

In another embodiment, if the ARO is used to indicate PUCCH resources of a SCell, the TPC field may be used for accumulated power control of the SCell. That is, the TPC field serves its original usage.

Embodiment 2—TDD

If PUCCH format 3 is configured for a UE, PUCCH resources may be determined based on a TPC field of a PDCCH other than a PDCCH with DAI=1 that schedules a PCell PDSCH or a PDCCH requiring an A/N response (e.g. a PDCCH indicating Pell DL SPS release). That is, the TPC field may indicate one of PUCCH format 3 resources explicitly allocated by higher-layer signaling. If PUCCH format 1b with channel selection is configured for the UE and a PDCCH scheduling a SCell PDSCH exists in a SCell, the TPC field may indicate one of PUCCH format 1b resources explicitly allocated by higher-layer signaling.

In the above case, since PUCCH resources are determined based on a TPC field, an ARO field may be padded with 0s.

Or as in the afore-described FDD, operations corresponding to the values of 2 ARO bits may be predefined/indicated by RRC signaling.

For example, the ARO may be used to indicate the transmission power of a subframe whose usage has been changed in eIMTA (the concept of changing the usage of a specific subframe(s) in a TDD subframe configuration). For example, if UL subframe k is changed to serve a DL usage, the transmission power of subframe k needs to be set to be lower than that of another DL subframe in order to minimize UL interference to a neighbor cell. Herein, the ARO is used to indicate the transmission power of subframe k.

In another example, the ARO may be used to indicate a subframe in which a UL/DL operation is switched in eIMTA.

In another embodiment, the ARO may be used for fine tuning of a PUCCH resource value. For example, once a PUCCH resource value is determined based on a TPC field, the PUCCH resource value may be adjusted by an ARO value. The ARO value may be, but not limited to, one of {−2, −1, 0, 2}. Other ARO values may be configured.

In another embodiment, the ARO may be used for TPC (accumulated power control). In this case, TPC may be fine-adjusted on a subframe basis.

The ARO may be used to indicate a PUCCH resource value among values indicated by higher-layer signaling. In this case, the TPC field may be used for the original purpose of accumulated power control or for fine tuning of the PUCCH resource value indicated by the ARO. For example, the TPC field may indicate one of {−2, −1, 0, 2} and the indicated value may be applied as an offset to the PUCCH resource value indicated by the ARO. In this case, a PUCCH resource value indicated by higher-layer signaling may be dynamically changed.

Configurations of Apparatuses According to Embodiment of the Present Invention

Figure 14:
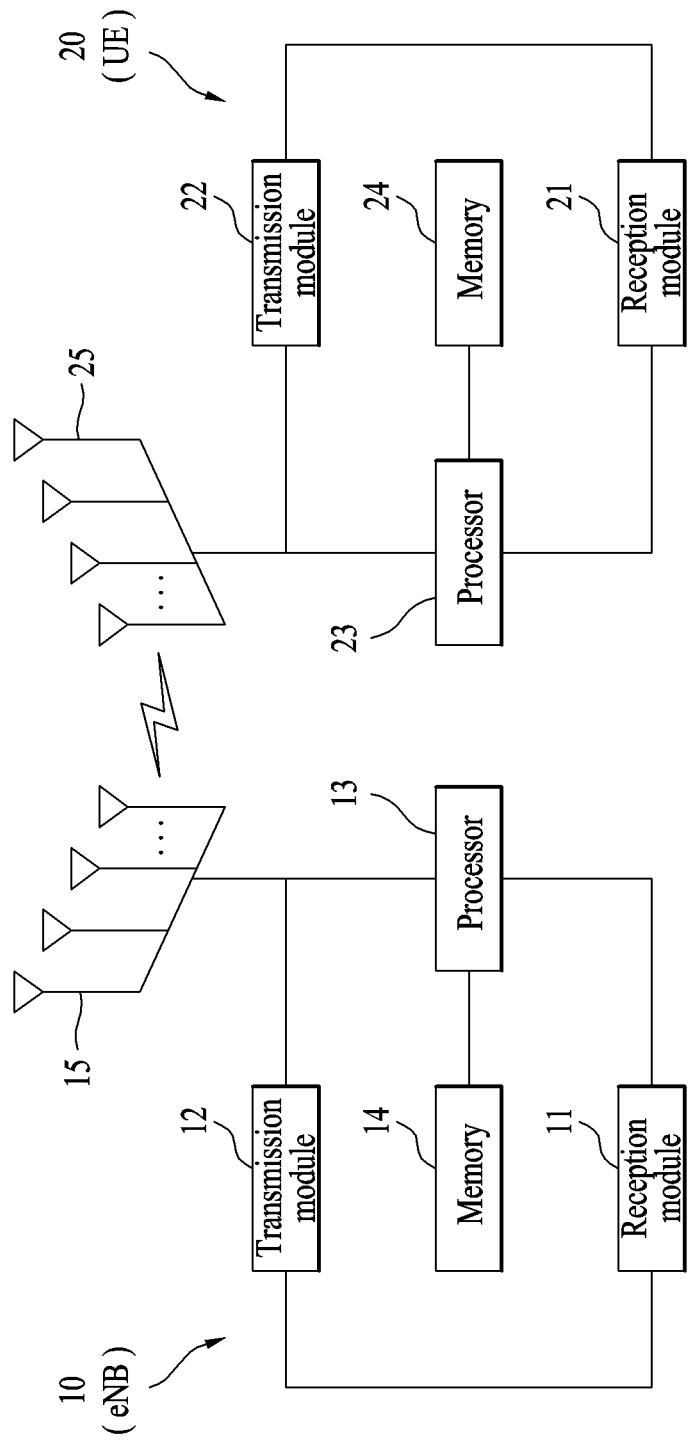
FIG. 14 is a block diagram of a transmission apparatus and a reception apparatus.

FIG. 14 is a block diagram of a transmission point and a UE according to an embodiment of the present invention.

Referring to FIG. 14, a transmission point 10 according to the present invention may include a reception module 11, a transmission module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The transmission module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 14 again, a UE 20 according to the present invention may include a reception module 21, a transmission module 22, a processor 23, a memory 24, and a plurality of antennas 25. Use of the plurality of antennas 25 means that the UE 20 supports MIMO transmission and reception using the plurality of antennas 25. The reception module 21 may receive DL signals, data, and information from an eNB. The transmission module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 14 is applicable to a relay as a DL transmitter or a UL receiver, and the description of the UE 20 in FIG. 14 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting a reception response in a wireless communication system, performed by a User Equipment (UE), the method comprising:
acquiring Downlink Control Information (DCI) via an Enhanced Physical Downlink Control Channel (EPDCCH);
receiving downlink data on a Physical Downlink Shared Channel (PDSCH); and
transmitting a reception response to the downlink data by using Physical Uplink Control Channel (PUCCH) resources,
wherein, if the PDSCH is transmitted on a Secondary Cell (SCell) and indicated by the EPDCCH, the PUCCH resources are determined to correspond to a combination of a value of the Transmit Power Control (TPC) field and a value of an offset field related to the PUCCH resources, among 16 PUCCH resource values, indicated by higher-layer signaling.

2. The method according to claim 1, wherein the offset field is padded with 0s.

3. The method according to claim 2, wherein the EPDCCH is transmitted in a Primary Cell (PCell).

4. The method according to claim 2, wherein the offset field is a Hybrid Automatic Repeat reQuest (HARQ)-ACKnowledgment (ACK) resource offset field.

5. The method according to claim 1, wherein the value of the offset field related to the PUCCH resources indicates one of {−2, −1, 0, 2}.

6. The method according to claim 1, wherein the DCI is formatted in one of DCI format 1, DCI format 1A, DCI format 1B, DCI format 1D, DCI format 2, DCI format 2A, DCI format 2B, DCI format 2C, and DCI format 2D.

7. The method according to claim 1, wherein the reception response includes at least one of an ACK, a Negative ACK (NACK), and a Discontinuous Transmission (DTX).

8. A User Equipment (UE) for transmitting a reception response to an Enhanced Physical Downlink Control Channel (EPDCCH) in a wireless communication system, the UE comprising:
a reception module; and
a processor,
wherein the processor is configured to acquire Downlink Control Information (DCI) via an EPDCCH, receive downlink data on a Physical Downlink Shared Channel (PDSCH), and transmit a reception response to the downlink data by using Physical Uplink Control Channel (PUCCH) resources, and
wherein, if the PDSCH is transmitted on a Secondary Cell (SCell) and indicated by the EPDCCH, the PUCCH resources are determined to correspond to a combination of a value of the Transmit Power Control (TPC) field and a value of an offset field related to the PUCCH resources, among 16 PUCCH resource values, indicated by higher-layer signaling.

* * * * *